(12) United States Patent
Hasegawa et al.

(10) Patent No.: US 12,188,294 B2
(45) Date of Patent: Jan. 7, 2025

(54) METHOD FOR MANUFACTURING MULTI-LAYER LAMINATE

(71) Applicant: Panasonic Intellectual Property Management Co., Ltd., Osaka (JP)

(72) Inventors: Kenji Hasegawa, Osaka (JP); Eiichi Uriu, Osaka (JP); Tasuku Ishibashi, Ishikawa (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 155 days.

(21) Appl. No.: 17/922,940

(22) PCT Filed: Apr. 16, 2021

(86) PCT No.: PCT/JP2021/015747
§ 371 (c)(1),
(2) Date: Nov. 2, 2022

(87) PCT Pub. No.: WO2021/225069
PCT Pub. Date: Nov. 11, 2021

(65) Prior Publication Data
US 2023/0151674 A1 May 18, 2023

(30) Foreign Application Priority Data
May 8, 2020 (JP) .................................. 2020-082838

(51) Int. Cl.
*B32B 17/06* (2006.01)
*B32B 17/10* (2006.01)
(Continued)

(52) U.S. Cl.
CPC ............ *E06B 3/6775* (2013.01); *B32B 17/06* (2013.01); *B32B 17/10* (2013.01); *B32B 27/30* (2013.01);
(Continued)

(58) Field of Classification Search
CPC ..... E06B 3/6775; E06B 3/6612; B32B 3/085; B32B 17/06; B32B 17/10; B32B 27/30;
(Continued)

(56) References Cited

U.S. PATENT DOCUMENTS 11,254,102 B2 * 2/2022 Aoki .......................... B60J 1/00
2019/0232619 A1 8/2019 Broekhuis et al.

FOREIGN PATENT DOCUMENTS

JP 2001-226153 A 8/2001
JP 2003-040655 A 2/2003
(Continued)

OTHER PUBLICATIONS

International Search Report dated Jul. 6, 2021 issued in International Patent Application No. PCT/JP2021/015747, with English translation.

*Primary Examiner* — James D Sells
(74) *Attorney, Agent, or Firm* — Rimon P.C.

(57) ABSTRACT

A multi-layer laminate includes a glass panel unit, an intermediate film, and a transparent plate. The transparent plate is assembled to the glass panel unit via the intermediate film. The glass panel unit includes a first and second glass panel, and an evacuated space. The evacuated space is interposed between the first and second glass panel. A method for manufacturing the multi-layer laminate includes a step. The step includes exhausting a gas from a bag, loaded with the glass panel unit, the intermediate film, and the transparent plate, to cause the bag to shrink and thereby assembling, using the bag thus shrunk, the glass panel unit
(Continued)

and the transparent plate via the intermediate film. The step includes raising a pressure inside the bag from a pressure at an initial stage of heating while increasing a temperature of the intermediate film to a predetermined temperature at which the intermediate film softens.

16 Claims, 9 Drawing Sheets

(51) Int. Cl.
    *B32B 27/30*     (2006.01)
    *B32B 37/04*     (2006.01)
    *B32B 37/10*     (2006.01)
    *B32B 37/18*     (2006.01)
    *C03C 27/06*     (2006.01)
    *E06B 3/66*     (2006.01)
    *E06B 3/677*     (2006.01)
    *B32B 3/08*     (2006.01)

(52) U.S. Cl.
    CPC .......... *B32B 37/04* (2013.01); *B32B 37/1018* (2013.01); *B32B 37/182* (2013.01); *C03C 27/06* (2013.01); *E06B 3/6612* (2013.01); *B32B 3/085* (2013.01); *B32B 2307/412* (2013.01); *B32B 2309/12* (2013.01); *B32B 2315/08* (2013.01); *B32B 2329/06* (2013.01)

(58) Field of Classification Search
    CPC ... B32B 37/04; B32B 37/1018; B32B 37/182; B32B 2307/412; B32B 2309/12; B32B 2315/08; B32B 2329/06; C03C 27/06
    USPC ........................................................ 156/103
    See application file for complete search history.

(56) References Cited

FOREIGN PATENT DOCUMENTS

| | | |
|---|---|---|
| JP | 2004-323317 A | 11/2004 |
| JP | 2015-529623 A | 10/2015 |
| WO | 2014/022118 A1 | 2/2014 |
| WO | 2019/219593 A1 | 11/2019 |
| WO | 2019/224363 A1 | 11/2019 |

* cited by examiner

METHOD FOR MANUFACTURING MULTI-LAYER LAMINATE

CROSS-REFERENCE OF RELATED APPLICATIONS

This application is the U.S. National Phase under 35 U.S.C. § 371 of International Patent Application No. PCT/JP2021/015747, filed on Apr. 16, 2021, which in turn claims the benefit of Japanese Patent Application No. 2020-082838, filed on May 8, 2020, the entire disclosures of which Applications are incorporated by reference herein.

TECHNICAL FIELD

The present disclosure generally relates to a method for manufacturing a multi-layer laminate. More particularly, the present disclosure relates to a method for manufacturing a multi-layer laminate including a glass panel unit, a transparent plate, and an intermediate film.

BACKGROUND ART

A glass panel unit has been known in the art as a structure, in which an evacuated space is provided between a pair of glass panels facing each other. For example, Patent Literature 1 discloses a vacuum-insulated glass window unit, in which a space is provided between two glass substrates.

There has been a growing demand for glass panel units with further improved thermal insulation properties and mechanical strength.

CITATION LIST

Patent Literature

Patent Literature 1: JP 2015-529623 A

SUMMARY OF INVENTION

In view of the foregoing background, it is therefore an object of the present disclosure to manufacture a multi-layer laminate with excellent thermal insulation properties and mechanical strength.

A method for manufacturing a multi-layer laminate according to an aspect of the present disclosure has the following feature. The multi-layer laminate includes a glass panel unit, an intermediate film, and a transparent plate assembled to the glass panel unit via the intermediate film. The glass panel unit includes a first glass panel, a second glass panel, and an evacuated space interposed between the first glass panel and the second glass panel. The method for manufacturing the multi-layer laminate includes a step. The step includes exhausting a gas from a bag, loaded with the glass panel unit, the intermediate film, and the transparent plate, to cause the bag to shrink and thereby assembling, using the bag thus shrunk, the glass panel unit and the transparent plate via the intermediate film. The step includes raising a pressure inside the bag from a pressure at an initial stage of heating while increasing a temperature of the intermediate film to a predetermined temperature at which the intermediate film softens.

DESCRIPTION OF EMBODIMENTS

Figure 1A:
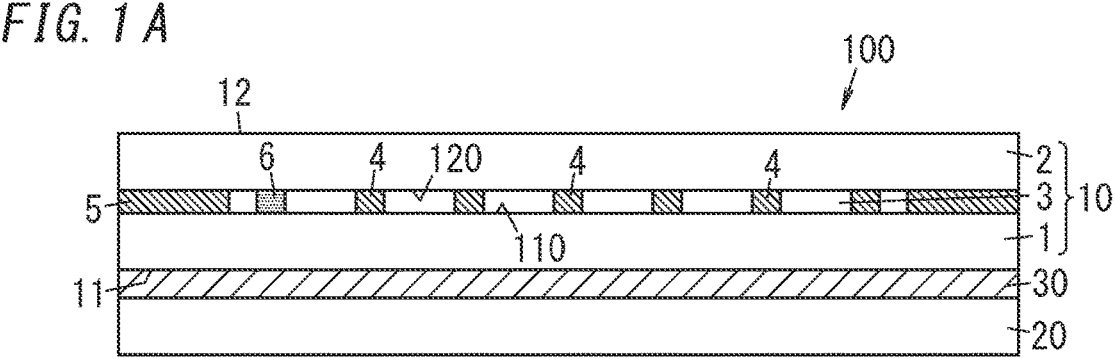
FIG. 1A is a schematic cross-sectional view illustrating an exemplary multi-layer laminate according to a first embodiment.

1. First Embodiment 1-1. Overview of First Embodiment

First, a first embodiment will be described. A method for manufacturing a multi-layer laminate 100 according to this embodiment is designed to manufacture the multi-layer laminate 100 shown in FIG. 1A. The multi-layer laminate 100 includes a glass panel unit 10, an intermediate film 30, and a transparent plate 20. The transparent plate 20 is assembled to the glass panel unit 10 via the intermediate film 30. The glass panel unit 10 includes a first glass panel 1, a second glass panel 2, and an evacuated space 3. The evacuated space 3 is interposed between the first glass panel 1 and the second glass panel 2.

The method for manufacturing the multi-layer laminate 100 according to this embodiment includes a step. The step includes exhausting a gas from a bag 40, loaded with the glass panel unit 10, the intermediate film 30, and the transparent plate 20, to cause the bag 40 to shrink and thereby assembling, using the bag 40 thus shrunk, the glass panel unit 10 and the transparent plate 20 via the intermediate film 30. The step includes raising a pressure inside the bag 40 from a pressure at an initial stage of heating while increasing a temperature of the intermediate film 30 to a predetermined temperature at which the intermediate film 30 softens.

In the multi-layer laminate 100 obtained by the manufacturing method according to this embodiment, the transparent plate 20 is assembled onto the glass panel unit 10 (see FIG. 1B) via the intermediate film 30. This enables manufacturing a multi-layer laminate 100 having excellent thermal insulation properties and mechanical strength.

In addition, the glass panel unit 10 and the transparent plate 20 are assembled to each other with the bag 40 that has been caused to shrink by exhausting gases therefrom. This enables applying pressure uniformly to the intermediate film 30 and reducing the chances of the intermediate film 30 losing its transparency or producing bubbles therein.

Furthermore, the step includes raising the pressure inside the bag 40 from the pressure at the initial stage of heating while increasing the temperature of the intermediate film 30 to a predetermined temperature at which the intermediate film 30 softens. This enables assembling the glass panel unit 10 and the transparent plate 20 together with an appropriate pressure while reducing the chances of the intermediate film 30 sticking out from the gap between the glass panel unit 10 and the transparent plate 20.

1-2. Details of First Embodiment

Next, the multi-layer laminate 100 according to the first embodiment and a method for manufacturing the same will be described in detail.

1-2-1. Multi-Layer Laminate

The multi-layer laminate 100 includes the glass panel unit 10, the transparent plate 20, and the intermediate film 30 as shown in FIG. 1A.

(1) Glass Panel Unit

Figure 1B:
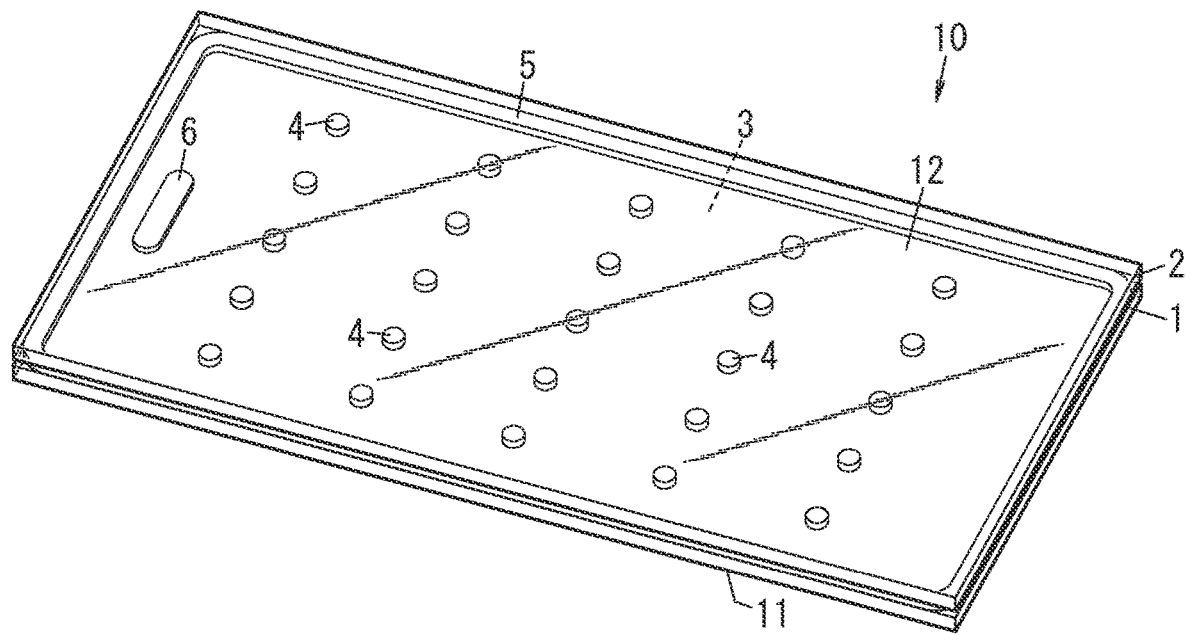
FIG. 1B is a schematic perspective view illustrating a glass panel unit included in the multi-layer laminate shown in FIG. 1A.

The glass panel unit 10 includes the first glass panel 1 and the second glass panel 2 as shown in FIG. 1B. The first glass panel 1 and the second glass panel 2 face each other.

The glass panel unit 10 further includes a frame-shaped sealant 5. The sealant 5 is provided between the first glass panel 1 and the second glass panel 2. The first glass panel 1, the sealant 5, and the second glass panel 2 are stacked in this order one on top of another. The sealant 5 hermetically bonds the first glass panel 1 and the second glass panel 2 together.

The glass panel unit 10 also includes the evacuated space 3. The evacuated space 3 is a hermetically sealed space surrounded with the first glass panel 1, the second glass panel 2, and the frame-shaped sealant 5.

The glass panel unit 10 further includes a plurality of pillars 4. The plurality of pillars 4 are provided in the evacuated space 3 between the first glass panel 1 and the second glass panel 2. These pillars 4 may maintain an interval (gap distance) between the first glass panel 1 and the second glass panel 2.

The glass panel unit 10 further includes a gas adsorbent 6. The gas adsorbent 6 is provided in the evacuated space 3. The gas adsorbent 6 adsorbs a gas in the evacuated space 3.

Next, the first glass panel 1, the second glass panel 2, the sealant 5, the evacuated space 3, the pillars 4, and the gas adsorbent 6 that form the glass panel unit 10 will be described in further detail.

(1.1) First Glass Panel

The first glass panel 1 is a plate member of glass. The first glass panel 1 may have a rectangular shape in plan view. However, the planar shape of the first glass panel 1 does not have to be rectangular but may also be any other polygonal shape, a circular shape, or an elliptical shape. The first glass panel 1 may have a flat plate shape or may also have a curved plate shape. The outer surface 11 of the first glass panel 1 may be either flat or curved, whichever is appropriate.

Examples of materials for the first glass panel 1 include soda lime glass, high strain point glass, chemically tempered glass, alkali-free glass, quartz glass, Neoceram, and thermally tempered glass. The thickness of the first glass panel 1 is not limited to any particular value but may fall within the range from 1 mm to 10 mm, for example.

The first glass panel 1 has the outer surface 11, which is a surface exposed to the external environment outside of the glass panel unit 10, and an inner surface 110 facing the second glass panel 2 (see FIG. 1A).

Optionally, a low-emissivity film may be provided on the inner surface 110 of the first glass panel 1. In that case, the low-emissivity film is located in the evacuated space 3. The low-emissivity film is a film containing a metal with low emissivity. The low-emissivity film has the capability of reducing the transfer of heat by radiation, and therefore, may reduce the transfer (emission) of the heat, generated by light (radiation) irradiating the outer surface 11 of the first glass panel 1, to the evacuated space 3. Examples of metals having low emissivity include silver.

(ii) Second Glass Panel

The second glass panel 2 is a plate member of glass. The second glass panel 2 has the same planar shape as the first glass panel 1 (see FIG. 1A). The second glass panel 2 may have a flat plate shape or may also have a curved plate shape. The outer surface 12 of the second glass panel 2 may be either flat or curved, whichever is appropriate. In other words, the glass panel unit 10 may have a flat plate shape or a curved plate shape, whichever is appropriate.

Examples of materials for the second glass panel 2 include soda lime glass, high strain point glass, chemically tempered glass, alkali-free glass, quartz glass, Neoceram, and thermally tempered glass. The material for the second glass panel 2 may be the same as, or different from, the material for the first glass panel 1. The thickness of the second glass panel 2 is not limited to any particular value but may fall within the range from 1 mm to 10 mm, for example. The thickness of the second glass panel 2 may be the same as, or different from, the thickness of the first glass panel 1.

The second glass panel 2 has the outer surface 12, which is a surface exposed to the external environment outside of the glass panel unit 10, and an inner surface 120 facing the first glass panel 1 (see FIG. 1A).

(1.3) Sealant

The sealant 5 according to this embodiment is formed in a rectangular frame shape. The sealant 5 is made of a hot glue. As the hot glue, a glass frit such as a low-melting glass frit may be used, for example. Examples of the low-melting glass frit include a bismuth-based glass frit, a lead-based glass frit, and a vanadium-based glass frit. The sealant 5 may contain one or more types of low-melting glass frits selected from this group.

(1.4) Evacuated Space

The evacuated space 3 is a space surrounded with the first glass panel 1, the second glass panel 2, and the sealant 5. The evacuated space 3 is preferably a vacuum space, for example. Specifically, the evacuated space 3 is preferably a space evacuated to a degree of vacuum of 0.1 Pa or less. This would improve the thermal insulation properties of the glass panel unit 10. Note that this pressure in the evacuation is only an example and should not be construed as limiting.

(1.5) Pillars

Each of the pillars 4 is a circular columnar member. The height (i.e., the dimension in the thickness direction) of the pillars 4 may be set appropriately according to the gap distance between the first glass panel 1 and the second glass panel 2. That is to say, the gap distance between the first glass panel 1 and the second glass panel 2 (i.e., the thickness of the evacuated space 3) is defined by the height of the pillars 4. The height of the pillars 4 may fall, for example, within the range from 10 μm to 1000 μm. The diameter of the pillars 4 may fall, for example, within the range from 0.1 mm to 10 mm. For example, pillars 4 with a diameter of 0.5 mm and a height of 100 μm may be used. The shape of the pillars 4 does not have to be circular columnar but may also be a rectangular columnar shape or a spherical shape.

The pillars 4 are preferably transparent. This would make the pillars 4 much less conspicuous in the multi-layer laminate 100 and thereby improve the appearance of the multi-layer laminate 100.

The pillars 4 are made of a resin and are preferably made of a polyimide resin, for example. This would reduce the thermal conductivity of the pillars 4 and thereby reduce the transfer of heat between the first glass panel 1 and the second glass panel 2 that are in contact with the pillars 4.

(1.6) Gas Adsorbent

The gas adsorbent 6 is placed in the evacuated space 3. The gas adsorbent 6 adsorbs gas molecules in the evacuated space 3. This increases the degree of vacuum in the evacuated space 3 and thereby improves the thermal insulation properties of the glass panel unit 10.

The gas adsorbent 6 may include, for example, a metallic getter material or a non-metallic getter material. The metallic getter material is a getter material of a metal having a metallic surface that may chemically adsorb gas molecules. Examples of the metallic getter materials include zirconium-based (such as Zr—Al and Zr—V—Fe) getter materials and titanium-based getter materials. Each of these metallic getter materials may adsorb molecules of a gas such as $H_2O$, $N_2$, $O_2$, $H_2$, or $CO_2$. In addition, heating and activating any of these metallic getter materials may also cause the gas molecules, chemically adsorbed into the metallic surface of the metallic getter material, to diffuse inside the metallic getter material. Thus, the gas adsorbent 6 containing the metallic getter material may adsorb molecules of a gas such as $H_2O$, $N_2$, $O_2$, $H_2$, or $CO_2$ in the evacuated space 3.

The non-metallic getter material is a getter material having a porous structure with the ability to adsorb gas molecules. Examples of the non-metallic getter materials include zeolite-based getter materials, activated carbon, and magnesium oxide. The zeolite-based getter material may include an ion-exchanged zeolite. In that case, examples of the ion exchange materials include K, $NH_4$, Ba, Sr, Na, Ca, Fe, Al, Mg, Li, H, and Cu. Each of these non-metallic getter materials can adsorb molecules of a gas such as a hydrocarbon-based gas (such as $CH_4$ and $C_2H_6$) or ammonia ($NH_3$) gas that a metallic getter material cannot adsorb. In addition, heating and activating any of these non-metallic getter materials may cause the gas molecules, which have been adsorbed into the porous structure of the non-metallic getter material, to be desorbed.

(1.7) Method for Manufacturing Glass Panel Unit

The glass panel unit 10 may be manufactured by, for example, the following method. First, a hot glue to be the sealant 5 is applied in a frame shape onto the inner surface 120 of the second glass panel 2. Next, the first glass panel 1 is laid on top of the second glass panel 2 such that the frame-shaped hot glue is sandwiched between the first glass panel 1 and the second glass panel 2, thereby forming a laminate including the first glass panel 1, the second glass panel 2, and the hot glue. Next, the laminate is heated in a heating furnace. In this manner, the sealant 5 is formed out of the frame-shaped hot glue. In addition, a gas is exhausted from the space surrounded with the first glass panel 1, the second glass panel 2, and the hot glue. In this manner, the glass panel unit 10 may be manufactured with the evacuated space 3 created therein.

(2) Transparent Plate

The transparent plate 20 shown in FIG. 1A is a transparent plate member with light-transmitting properties. The transparent plate 20 not only improves the mechanical strength, thermal insulation properties, and sound insulation of the multi-layer laminate 100 but also imparts various functions to the multi-layer laminate 100 according to the shape, capability, or any other parameter of the transparent plate 20. The transparent plate 20 is provided for the outer surface 11, 12 of at least one of the first glass panel 1 or the second glass panel 2. In the multi-layer laminate 100 according to this embodiment, the transparent plate 20 is provided for the outer surface 11 of the first glass panel 1. The transparent plate 20 faces the glass panel unit 10. The transparent plate 20 also faces the first glass panel 1.

The planar shape of the transparent plate 20 may be the same as the planar shape of the glass panel unit 10, for example. In this embodiment, the transparent plate 20 has the same planar shape as the first glass panel 1. The glass panel unit 10 may be flat or curved as described above. Accordingly, the transparent plate 20 may also be flat or curved, whichever is appropriate.

The thickness of the transparent plate 20 is not limited to any particular value but preferably falls, for example, within the range from 0.5 mm to 12 mm, and more preferably falls within the range from 1 mm to 6 mm. This may reduce the weight of the multi-layer laminate 100 while ensuring sufficient mechanical strength for the multi-layer laminate 100.

The material for the transparent plate 20 is not limited to any particular one as long as the material has light-transmitting properties. For example, the transparent plate 20 is preferably made of polycarbonate. This may reduce the weight of the transparent plate 20 and thereby reduce the overall weight of the multi-layer laminate 100.

The transparent plate 20 is preferably made of glass, for example. This may increase the mechanical strength of the transparent plate 20 and eventually increase the mechanical strength of the multi-layer laminate 100. If the transparent plate 20 is made of glass, examples of specific glass materials for the transparent plate 20 include annealed glass, chemically tempered glass, and thermally tempered glass.

(3) Intermediate Film

The intermediate film 30 is interposed between the glass panel unit 10 and the transparent plate 20. In this embodiment, the intermediate film 30 is interposed between the first glass panel 1 and the transparent plate 20. The glass panel unit 10 and the transparent plate 20 are bonded together via this intermediate film 30. In this embodiment, the first glass panel 1 and the transparent plate 20 are bonded together via the intermediate film 30.

The intermediate film 30 is preferably provided over not only the entire outer surface, facing the transparent plate 20, of the glass panel unit 10 (i.e., the outer surface 11 of the first glass panel 1 in this embodiment) but also the entire surface, facing the glass panel unit 10, of the transparent plate 20. The planar shape of the intermediate film 30 is preferably the same as not only that of the (first glass panel 1 of the) glass panel unit 10 but also that of the transparent plate 20 as well.

The thickness of the intermediate film 30 is not limited to any particular value as long as the intermediate film 30 may bond the (first glass panel 1 of the) glass panel unit 10 and the transparent plate 20 together but preferably falls, for example, within the range from 0.3 mm to 4 mm and more preferably falls within the range from 0.3 mm to 2 mm. This allows the glass panel unit 10 to hold the transparent plate 20 easily and also makes it easier to maintain the light-transmitting properties of the multi-layer laminate 100.

The material for the intermediate film 30 is not limited to any particular one as long as the intermediate film 30 may bond the (first glass panel 1 of the) glass panel unit 10 and the transparent plate 20 together and has light-transmitting properties. For example, the material for the intermediate film 30 is preferably a sheet-shaped resin with light-transmitting properties and is more preferably a sheet of a thermoplastic resin. The intermediate film 30 may be configured as a single sheet of resin or a stack of multiple sheets of resin. If the intermediate film 30 is configured as a stack of multiple sheets of resin, some matter may be interposed between the multiple sheets of resin to improve its design and decorativeness. Examples of such interposed mater include a PET film, a sheet of metal foil, and a plant.

The intermediate film 30 is preferably made of a polyvinyl butyral (PVB) resin, for example. The PVB resin is preferred because the PVB resin not only is able to bond the glass panel unit 10 and the transparent plate 20 firmly but also has excellent transparency. In addition, the intermediate film 30 made of the PVB resin may also increase the mechanical strength of the multi-layer laminate 100. Moreover, the PVB resin increases the anti-penetration ability of the multi-layer laminate 100 as well.

The intermediate film 30 is also preferably made of an ethylene vinyl acetate (EVA) copolymer resin, for example. The EVA resin is preferred because of its excellent transparency and flexibility. In addition, the intermediate film 30 made of the EVA resin also increases the anti-scattering ability of the multi-layer laminate 100. Furthermore, the EVA resin also allows the glass panel unit 10 and the transparent plate 20 to be bonded at a relatively low temperature via the intermediate film 30. Moreover, the EVA resin increases the transportability of the multi-layer laminate 100 as well.

The intermediate film 30 is also preferably made of a cycloolefin resin, for example. The cycloolefin resin is preferred because of its excellent transparency and flexibility. In addition, the intermediate film 30 made of the cycloolefin resin also increases the anti-scattering ability of the multi-layer laminate 100. Furthermore, the cycloolefin resin also allows the glass panel unit 10 and the transparent plate 20 to be bonded at a relatively low temperature via the intermediate film 30. Moreover, the cycloolefin resin increases the transportability of the multi-layer laminate 100 as well.

The intermediate film 30 is also preferably made of an ionomer resin, for example. The ionomer resin is preferred because of its excellent transparency and flexibility and high mechanical strength. In addition, the intermediate film 30 made of the ionomer resin also increases the anti-scattering ability of the multi-layer laminate 100. Furthermore, the ionomer resin also allows the glass panel unit 10 and the transparent plate 20 to be bonded at a relatively low temperature via the intermediate film 30. Moreover, the ionomer resin increases the transportability of the multi-layer laminate 100 as well. As used herein, the "ionomer resin" refers to a resin with a special structure in which the molecules of an ethylene-methacrylic acid copolymer or an ethylene-acrylic acid copolymer are bonded together by intermolecular bonding with ions of a metal such as sodium or zinc.

The intermediate film 30 is also preferably made of a polyolefin resin, for example. The polyolefin resin is preferred because of its excellent transparency and flexibility. In addition, the intermediate film 30 made of the polyolefin resin also increases the anti-scattering ability of the multi-layer laminate 100. Furthermore, the polyolefin resin also allows the glass panel unit 10 and the transparent plate 20 to be bonded at a relatively low assembling temperature falling within the range from 80° C. to 110° C. via the intermediate film 30. Moreover, the polyolefin resin increases the transportability of the multi-layer laminate 100 as well.

Thus, the intermediate film 30 preferably includes at least one resin selected from the group consisting of the PVB resin, the EVA resin, the cycloolefin resin, the ionomer resin, and the polyolefin resin.

1-2-2. Method for Manufacturing Multi-Layer Laminate

The multi-layer laminate 100 according to this embodiment may be manufactured by performing, for example, the following process steps. Note that the following method for manufacturing the multi-layer laminate 100 is only an example and should not be construed as limiting.

Figure 2A:
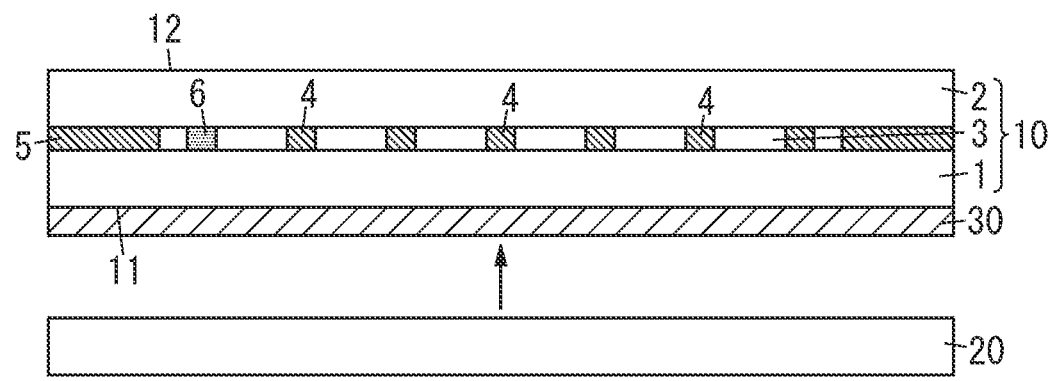
FIGS. 2A and 2B are schematic cross-sectional views illustrating an exemplary method for manufacturing the multi-layer laminate according to the first embodiment.

First, the glass panel unit 10, the transparent plate 20, and the intermediate film 30 are provided. Next, the glass panel unit 10 and the transparent plate 20 are assembled together via the intermediate film 30 (see FIG. 2A). More specifically, the outer surface 11, 12 of at least one of the first glass panel 1 or the second glass panel 2 and the transparent plate 20 are assembled together via the intermediate film 30. In this embodiment, the outer surface 11 of the first glass panel 1 and the transparent plate 20 are assembled together via the intermediate film 30 made of a sheet of resin as shown in FIG. 2A. In this manner, the multi-layer laminate 100 shown in FIG. 1A is obtained.

The glass panel unit 10 and the transparent plate 20 may be assembled together via the intermediate film 30 by, for example, the following vacuum bagging process. The assembling method by vacuum bagging process includes a preparatory step, an assembling step, and a cooling step. That is to say, the method for manufacturing the multi-layer laminate 100 according to this embodiment includes the preparatory step, the assembling step, and the cooling step.

Figure 2B:
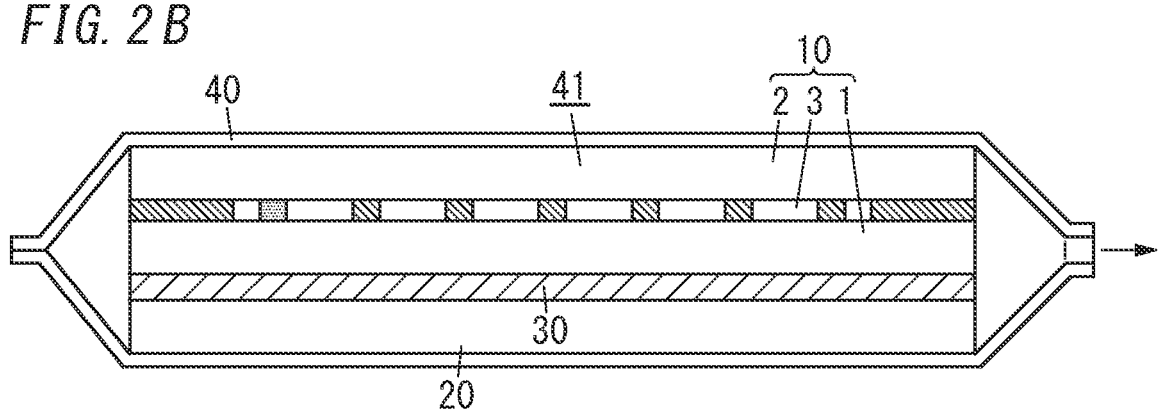

The preparatory step includes forming a laminate 41 including the glass panel unit 10, the transparent plate 20, and the intermediate film 30 by sandwiching the intermediate film 30 made of a sheet of resin between the glass panel unit 10 and the transparent plate 20. Then, the laminate 41 is loaded a bag (vacuum bag) 40 as shown in FIG. 2B. Note that the bag 40 may be transparent, semi-transparent, or even opaque.

The assembling step is performed after the preparatory step. The assembling step includes exhausting a gas from a bag 40, loaded with the laminate 41, to cause the bag 40 to shrink and applying, using the bag 40 thus shrunk, pressure to the laminate 41 in the thickness direction, thereby assembling the glass panel unit 10 and the transparent plate 20 via the intermediate film 30. This assembling step includes heating the laminate 41 while evacuating the bag 40. This causes the intermediate film 30 to be heated and soften. The intermediate film 30 in such a state is sandwiched between the glass panel unit 10 and the transparent plate 20 that are being pressed by the bag 40. In this manner, the glass panel unit 10 and the transparent plate 20 are assembled together via the intermediate film 30.

In the assembling step, the inside of the bag 40 is evacuated by, for example, making a vacuum pump, connected to the bag 40, exhaust a gas therefrom. In addition, in the assembling step, as the bag 40 enclosing the laminate 41 is heated by a furnace 7 (see FIG. 3), for example, the laminate 41 is heated to a predetermined temperature at which the intermediate film 30 melts and softens. The predetermined temperature may be 140° C., for example. Note that the predetermined temperature varies depending on the softening temperature of the intermediate film 30 to use. Thus, the temperature needs to be adjusted to the properties of the intermediate film 30 to use but normally preferably falls within the range from 135° C. to 140° C. Note that the predetermined temperature is not limited to any particular temperature. For example, if a material that softens at a low temperature is used as a material for the intermediate film 30, then the predetermined temperature may be set at a temperature falling within the range from 80° C. to 110° C.

In the assembling step, while the glass panel unit 10 and the transparent plate 20 are being assembled together, pressing pressure is applied from the bag 40 to the glass panel unit 10 and the transparent plate 20. That is to say, the "pressing pressure" as used herein refers to the pressure applied to the laminate 41 while the intermediate film 30 is being clamped between the glass panel unit 10 and the transparent plate 20. If the pressure outside of the bag 40 is the atmospheric pressure, for example, the pressing pressure is a differential pressure between the pressure (degree of vacuum) inside the bag 40 and the atmospheric pressure. That is to say, the lower the pressure inside the bag 40 is, the greater the pressing pressure is. Note that the pressure outside of the bag 40 does not have to be the atmospheric pressure.

If the pressing pressure were too high, then the plurality of pillars 4 included in the glass panel unit 10 would collapse under the excessive pressure. In that case, this would cause damage to the glass panel unit 10 or cause a decline in the thermal insulation properties, the mechanical strength, or other properties of the glass panel unit 10. Thus, in this embodiment, the pressing pressure is preferably approximately as high as the pressure for evacuating the bag 40 with a vacuum pump, e.g., approximately 0.1 MPa or less, which is less than the compressive strength of the plurality of pillars 4. This may reduce the chances of the plurality of pillars 4 collapsing under the excessive pressure.

In this embodiment, the pressing pressure is preferably equal to or lower than 3 atmosphere [atm] ($\simeq$0.3 MPa), and more preferably equal to or lower than 1 atm ($\simeq$0.1 MPa). Thus, the glass panel unit 10 and the transparent plate 20 are assembled together with a pressure approximately as high as the pressure for evacuating the bag 40 with a vacuum pump without applying further pressure to the bag 40 with a press machine, for example. The lower limit value of the pressing pressure is not limited to any particular value as long as the glass panel unit 10 and the transparent plate 20 may be assembled together, but is preferably equal to or greater than 0.02 atm ($\simeq$0.002 MPa) and more preferably equal to or greater than 0.03 atm ($\simeq$0.003 MPa). This may further reduce the chances of the plurality of resin pillars 4 collapsing under the excessive pressure, particularly when the pillars 4 are made of a polyimide resin. That is to say, the pressing pressure preferably falls within the range from 0.02 atm to 3 atm and more preferably falls within the range from 0.03 atm to 1 atm.

The cooling step is performed after the assembling step. The cooling step includes cooling the laminate 41 inside the bag 40. This allows the intermediate film 30 that has softened in the assembling step to be cooled and cured, thus integrating the glass panel unit 10 and the transparent plate 20 together via the intermediate film 30. In the cooling step, the laminate 41 may be cooled by, for example, stopping heating the bag 40 using the furnace 7 described above.

In general, to bond the glass panel unit 10 and the transparent plate 20 together with the intermediate film 30 of the PVB resin, heat and pressure need to be applied with an autoclave machine used. In that case, the pressure applied to the intermediate film 30 is usually 13 atm ($\simeq$1.3 MPa), for example. Depending on the condition for applying heat and pressure, however, the pillars 4 included in the glass panel unit 10 would be deformed or the first glass panel 1, the second glass panel 2, or other members of the glass panel unit 10 would be damaged or deformed, for example. In contrast, the PVB resin may bond the glass panel unit 10 and the transparent plate 20 only by heating, without using any autoclave machine, by reducing the moisture content thereof. This allows the glass panel unit 10 and the transparent plate 20 to be bonded together only by heating by drying the intermediate film 30 of the PVB resin and then assembling the glass panel unit 10 and the transparent plate 20 via the intermediate film 30.

According to an exemplary method for drying the intermediate film 30, only the intermediate film 30 may be loaded, as either a roll or a flat film, into a large chamber in which a desiccant such as a silica gel is put, and then a gas may be exhausted from the large chamber using a vacuum pump to maintain a predetermined degree of vacuum. According to this method, the intermediate film 30 may be dried and may have its moisture content decreased. The dried intermediate film 30 made of the PVB resin is heated while being sandwiched between the glass panel unit 10 and the transparent plate 20 in the bag 40 as described above. In this manner, the glass panel unit 10 and the transparent plate 20 are assembled together via the intermediate film 30.

The condition for drying the intermediate film 30 may be set appropriately according to the size, thickness, or any other parameters of the intermediate film 30. For example, the intermediate film 30 is preferably dried for at least 12 hours, preferably 48 hours or more, in a state where the pressure in the large chamber lowers to 0.1 atm ($\simeq$0.01 MPa) or less, for example.

To assemble the glass panel unit 10 and the transparent plate 20 together without using an autoclave machine, the moisture content of the intermediate film 30 before the glass panel unit 10 and the transparent plate 20 are assembled together is preferably set at a value equal to or greater than 0.1% by weight and equal to or less than 0.5% by weight. Also, the moisture content of the intermediate film 30 is more preferably set at a value equal to or greater than 0.15% by weight and equal to or less than 0.3% by weight. This enables assembling the glass panel unit 10 and the transparent plate 20 together via the intermediate film 30 while reducing the deformation of the pillars 4 and the damage and deformation of the first glass panel 1 and the second glass panel 2. In addition, in this case, if the intermediate film 30 is a PVB resin sheet, this may also reduce the chances of causing a decline in the anti-penetration ability of the intermediate film 30 and/or the loss of transparency of the intermediate film 30 or the production of bubbles therein.

In addition, applying non-uniform pressure to the intermediate film 30 while assembling the glass panel unit 10 and the transparent plate 20 together via the intermediate film 30 made of the PVB resin is another cause of the loss of transparency of the intermediate film 30 and/or the production of bubbles therein. According to this embodiment, however, adopting the assembling method by the vacuum bagging process described above allows the glass panel unit 10 and the transparent plate 20 to be assembled together so that pressure is applied uniformly to the intermediate film 30. Consequently, this may reduce the chances of causing the loss of transparency of the intermediate film 30 and the production of bubbles therein. Note that the intermediate film 30 is preferably dried before being loaded into the bag 40. However, the intermediate film 30 may also be dried after having been loaded into the bag 40 because the humidity inside the bag 40 may be decreased by evacuation.

Figure 3:
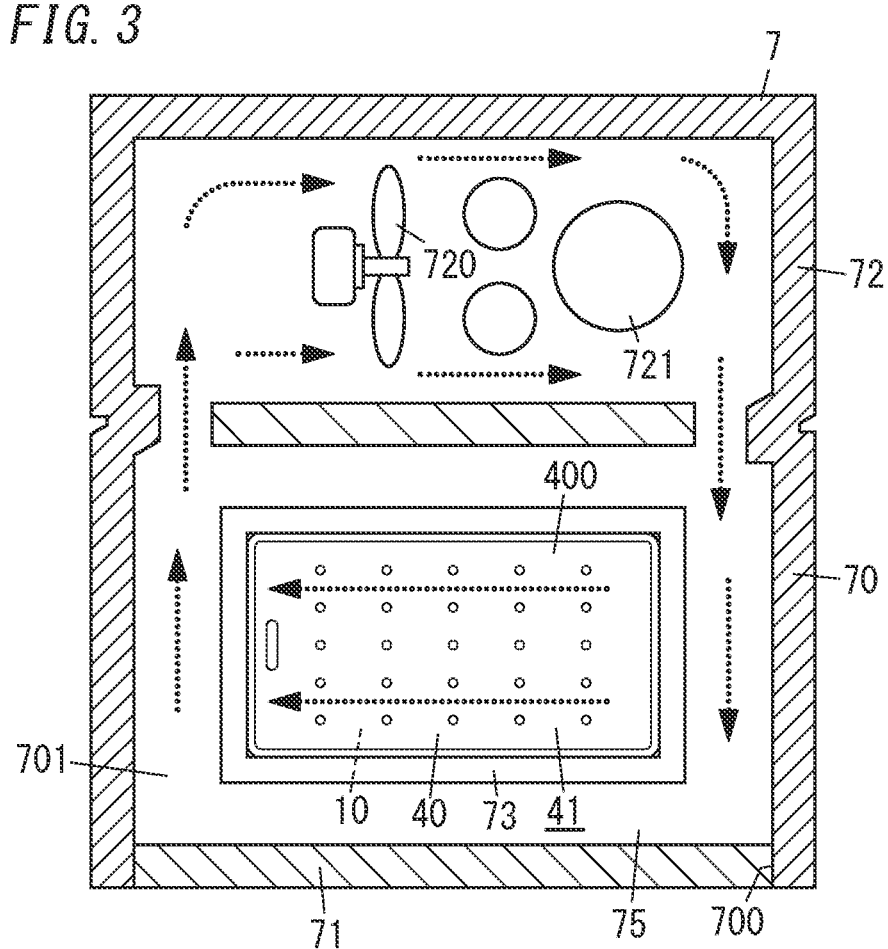
FIG. 3 is a horizontal cross-sectional view of a furnace for use in the method for manufacturing the multi-layer laminate.

The bag 40 loaded with the laminate 41 in the assembling step may be heated, for example, by the furnace 7 shown in FIG. 3. In the following description, the bag 40 loaded with the laminate 41 will be hereinafter referred to as a "target 400."

The furnace 7 is a hot air dryer and includes a heating chamber 70, a door 71, a hot air circulator 72, and a base 73. An opening 700 is provided in front of the heating chamber 70. Inside the furnace 7, a heating space 701 is created in the heating chamber 70. The heating space 701 is opened forward through the opening 700. The target 400 mounted on the base 73 may be loaded and unloaded, along with the base 73, for example, into/out of the heating space 701 through the opening 700. The door 71 is used to expose and shut the opening 700.

The hot air circulator 72 includes a blower 720 and a heater 721. The blower 720 circulates the air in the heating space 701. The heater 721 heats the gas circulated by the blower 720. The heater 721 may be a heat exchanger, for example. The hot air circulator 72 circulates the hot air to cause the hot air to flow, for example, in one direction substantially parallel to the rightward/leftward direction in the heating space 701 as shown in FIG. 3. The arrows shown in FIG. 3 indicate the direction in which the hot air flows inside the furnace 7.

In the furnace 7 (i.e., in the heating space 701), the base 73 is installed. The base 73 has a flat upper surface on which the target 400 is mounted.

Figure 4:
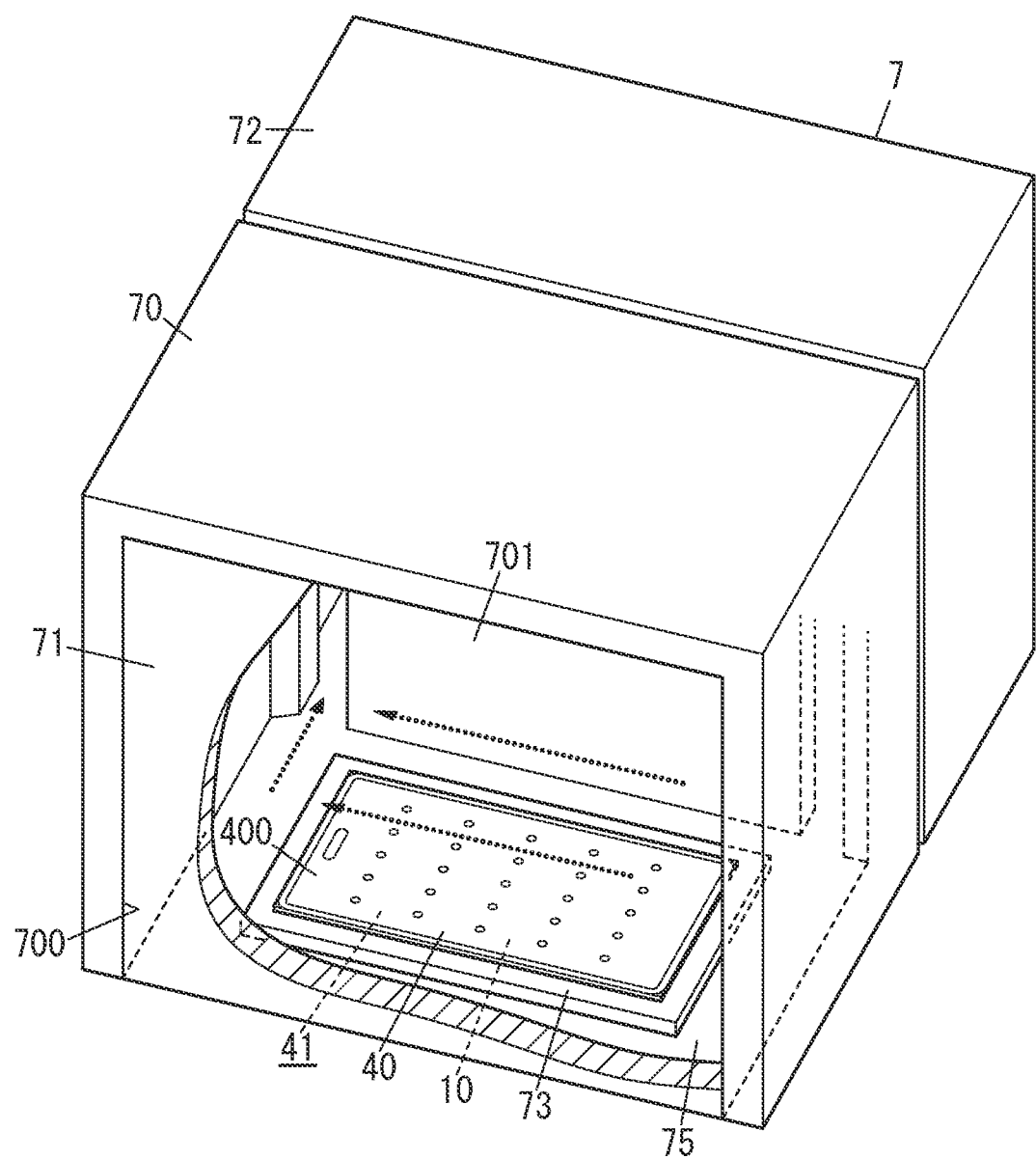
FIG. 4 is a perspective view illustrating how to dry a target placed in a flat position according to the method for manufacturing the multi-layer laminate.

FIG. 4 illustrates an example in which the glass panel unit 10 is heated with the target 400 placed in a flat position on the base 73 installed in the heating space 701 (i.e., in the furnace 7). The glass panel unit 10 has excellent thermal insulation properties. Thus, if the target 400, in which the transparent plate 20 is laid on top of the glass panel unit 10 with the intermediate film 30 interposed between them (see FIG. 1) inside the bag 40, for example, is mounted on the upper surface of the base 73, then heat will not be transferred smoothly from the base 73 to the intermediate film 30. On the other hand, if the target 400, in which the glass panel unit 10 is laid on top of the transparent plate 20 with the intermediate film 30 interposed between themselves in the bag 40, is mounted on the upper surface of the base 73, then heat will not be transferred smoothly from the hot air, passing over the target 400, to the intermediate film 30. Unless heat is transferred uniformly to the intermediate film 30, the glass panel unit 10 and the transparent plate 20 may fail to be bonded together uniformly, or there will be a significant difference in temperature between the first glass panel 1 and the second glass panel 2 of the glass panel unit 10, thus possibly increasing the warpage of the glass panel unit 10 to the point of breaking either the first glass panel 1 or the second glass panel 2. For these reasons, heat is preferably transferred uniformly to the intermediate film 30.

Therefore, if the target 400 placed in a flat position on the base 73 as described above is heated inside the furnace 7, then a gap is preferably left, for example, between the target 400 and the base 73 on which the target 400 is mounted. In that case, the target 400 may be in either a state where the glass panel unit 10 is disposed over the transparent plate 20 with the intermediate film 30 interposed between themselves or in a state where the transparent plate 20 is disposed over the glass panel unit 10 with the intermediate film 30 interposed between themselves, whichever is appropriate. Such a gap may be left by, for example, placing the target 400 on the base 73 with a plurality of spacers interposed between the target 400 and the base 73. This allows the target 400 to be heated not only from over, but also from under, the bag 40. This enables heating the bag 40 from both sides more easily, thus making it easier to heat the intermediate film 30 uniformly.

Figure 5:
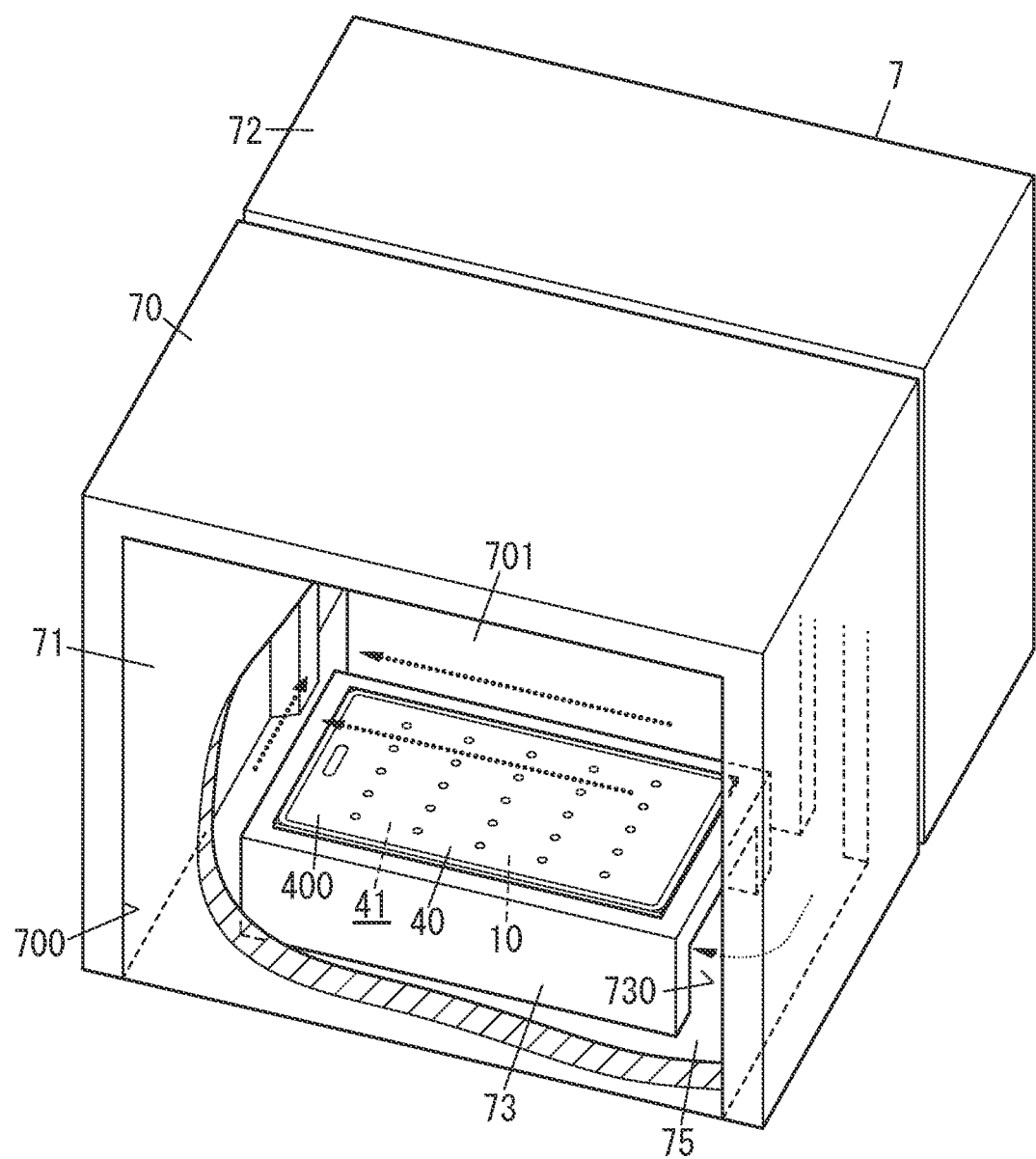
FIG. 5 is a perspective view illustrating how to heat the target in a different manner from in FIG. 4 according to the method for manufacturing the multi-layer laminate.

In addition, as shown in FIG. 5, a ventilation space 730 allowing gases to pass therethrough is preferably provided for the base 73. In the example shown in FIG. 5, the lower surface of the base 73 is provided with a groove that extends along the entire length of the base 73 in the rightward/leftward direction and the space inside this groove serves as the ventilation space 730. In this case, the target 400 may be in either a state where the glass panel unit 10 is disposed over the transparent plate 20 with the intermediate film 30 interposed between themselves or in a state where the transparent plate 20 is disposed over the glass panel unit 10 with the intermediate film 30 interposed between themselves, whichever is appropriate. Letting the hot air (i.e., the gas in the furnace 7) pass through such a ventilation space 730 causes an increase in the temperature of the base 73 and causes the bag 40 placed in a flat position on the base 73 to be heated. This may eliminate, or minimize to say the least, the difference in temperature between the first glass panel 1 and the second glass panel 2 of the glass panel unit 10. This makes it easier to heat the intermediate film 30 uniformly. Note that although the ventilation space 730 shown in FIG. 5 is provided between the base 73 and an installation surface 75 on which the base 73 is installed, the ventilation space 730 may also be created inside the base 73. The ventilation space 730 may also be, for example, a through hole running through the base 73 in the rightward/leftward direction.

If the ventilation space 730 is created in the base 73 as shown in FIG. 5, the material for the base 73 is preferably a material such as aluminum having better thermal conductivity than the bag 40. Also, in that case, the thickness of the base 73 (made of aluminum) is preferably equal to or greater than 5 mm. Optionally, a raised portion having such a shape as to collect heat such as a heat sink may be provided for a portion, exposed to the hot air, of the base 73 (which is made of a material with good thermal conductivity). Examples of materials with good thermal conductivity include not only aluminum but also metals such as copper and brass, thermally conductive ceramics such as alumina, graphite, and a laminate including a composite of these materials.

On the other hand, if the material for the base 73 does not have good thermal conductivity, then the surface of the base 73 may have through holes as in a punched mesh structure, to allow the heat to be transferred smoothly through the surface. In addition, a flat plate having a larger size than the bag 40 and made of a material having good thermal conductivity such as aluminum may be sandwiched between the base 73 and the bag 40. In that case, the flat plate made of the material having good thermal conductivity preferably has a thickness equal to or greater than 5 mm. Examples of materials with good thermal conductivity include not only aluminum but also metals such as copper and brass, thermally conductive ceramics such as alumina, graphite, and a laminate including a composite of these materials.

Figure 6:
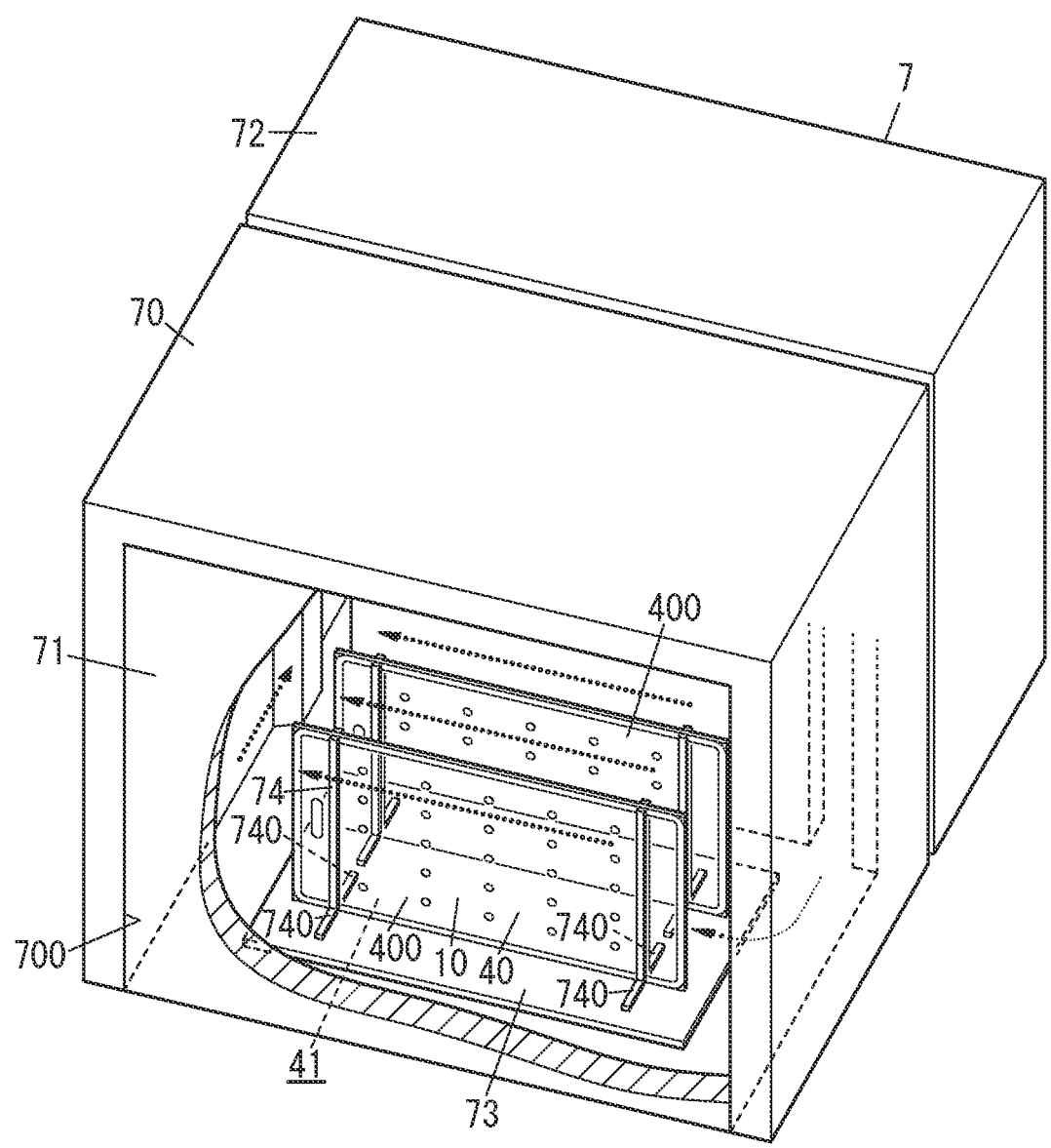
FIG. 6 is a perspective view illustrating how to dry the target placed in an upright position according to the method for manufacturing the multi-layer laminate.

Alternatively, the target 400 is also preferably heated, for example, in an upright position as shown in FIG. 6. In that case, the target 400 may be mounted, for example, on the base 73 such that the glass panel unit 10, the intermediate film 30, and the transparent plate 20 are arranged in this order in the forward/backward direction and the thickness of each of the glass panel unit 10, the intermediate film 30, and the transparent plate 20 is substantially parallel to the forward/backward direction. This also allows the target 400 to be heated more easily from both sides thereof (i.e., from both sides of the bag 40), thus making it easier to heat the intermediate film 30 uniformly.

Optionally, if the target 400 is heated in the upright position, then the target 400 may be supported by, for example, a supporter 74 shown in FIG. 6. The supporter 74 includes a plurality of supporting members 740, supporting only right and left end portions of the target 400. Using such a supporter 74 allows holding the target 400 in the upright position while reducing the chances of applying force to the glass panel unit 10 and the transparent plate 20 loaded in the bag 40.

In general, when the intermediate film 30 made of an EVA resin is used, the glass panel unit 10 and the transparent plate 20 may be bonded together even at a lower heating temperature than the PVB resin. Thus, bonding the glass panel unit 10 and the transparent plate 20 together via the intermediate film 30 made of the EVA resin may reduce the chances of causing deformation of the pillars 4 included in the glass panel unit 10 and deformation, damage, and other inconveniences of the first glass panel 1 and second glass panel 2 thereof. Furthermore, even when the intermediate film 30 made of the EVA resin is used, the glass panel unit 10, the intermediate film 30, and the transparent plate 20 are also preferably arranged in the bag 40 and the glass panel unit 10 and the transparent plate 20 are preferably assembled together via the intermediate film 30 with gases exhausted from the bag 40. That is to say, the glass panel unit 10 and the transparent plate 20 are preferably bonded together by the vacuum bagging process. This makes it easier to apply pressure uniformly to the intermediate film 30, thus obtaining a multi-layer laminate 100 with a uniform thickness more easily.

In this case, in the method for manufacturing the multi-layer laminate 100 according to this embodiment, the assembling step described above includes raising the pressure inside the bag 40 from a pressure at an initial stage of heating while increasing the temperature of the intermediate film 30 to a predetermined temperature at which the intermediate film 30 melts. Specifically, the assembling step includes starting heating the intermediate film 30 with the pressure reduced inside the bag 40 and then raising the pressure inside the bag 40 from the pressure inside the bag 40 when the intermediate film 30 starts being heated.

Figure 7:
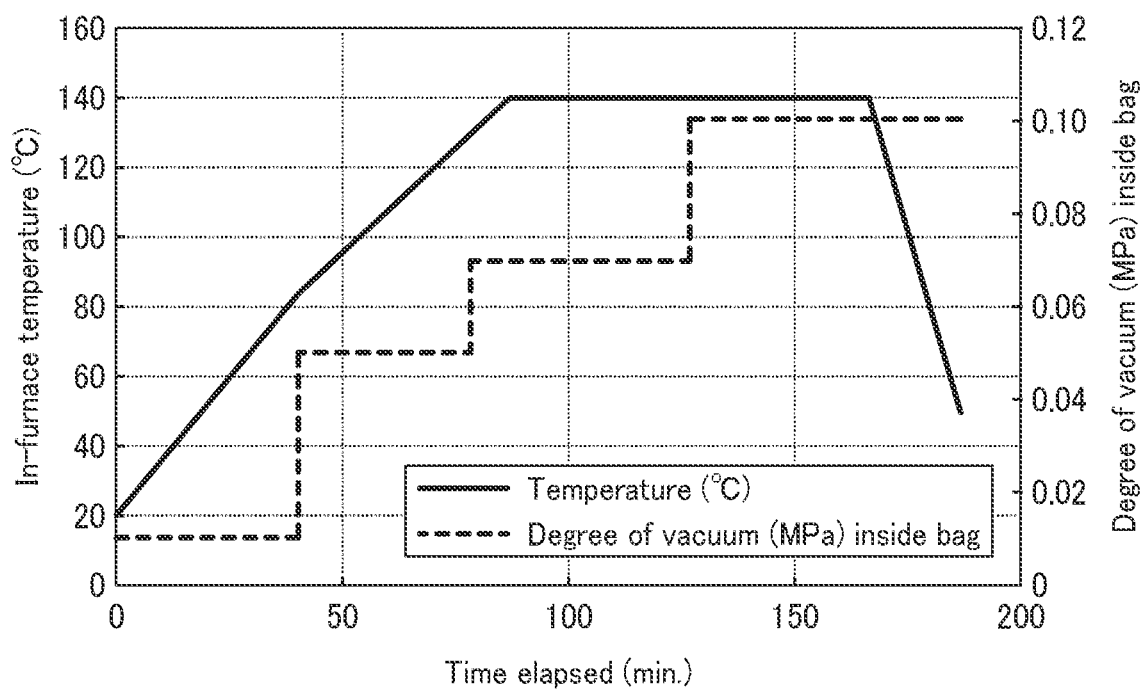
FIG. 7 is a graph showing how the in-furnace temperature and the pressure inside a bag change with time in the step of assembling a glass panel unit and a transparent plate that are included in the multi-layer laminate.

FIG. 7 is a graph showing how the temperature inside the furnace 7 and the pressure inside the bag 40 change with time in the assembling step in a situation where the intermediate film 30 is made of a PVB resin. In the example illustrated in FIG. 7, the assembling step includes raising (increasing) the pressure inside the bag 40 stepwise while continuously increasing the temperature inside the furnace 7 from normal temperature to 140° C. that is the softening temperature (predetermined temperature) of the intermediate film 30. Raising the pressure inside the bag 40 (lowering the pressing pressure) in this manner according to the temperature inside the furnace 7 which is correlated to the temperature of the intermediate film 30 enables assembling the glass panel unit 10 and the transparent plate 20 with an appropriate pressure while reducing the chances of the intermediate film 30 sticking out from the gap between the glass panel unit 10 and the transparent plate 20.

In the assembling step, the pressing pressure with which the laminate is pressed by the bag 40 is preferably changed within the range from 0.02 atm to 3 atm. This enables assembling the glass panel unit 10 and the transparent plate 20 together with a more appropriate pressure while further reducing the chances of the intermediate film 30 sticking out from the gap between the glass panel unit 10 and the transparent plate 20.

Specifically, in the assembling step, first, the pressure inside the bag 40 is set at 0.01 MPa and the pressing pressure is set at 0.09 MPa. In this state, heating is started inside the furnace 7. Thereafter, when the temperature inside the furnace 7 reaches 85° C., the pressure inside the bag 40 is raised to 0.05 MPa and the pressing pressure is set at 0.05 MPa. Subsequently, when the temperature inside the furnace 7 reaches 130° C., the pressure inside the bag 40 is further raised to 0.07 MPa and the pressing pressure is lowered to 0.03 MPa. After that, the pressure inside the bag 40 is maintained at 0.07 MPa. When a predetermined time passes since the point in time when the temperature inside the furnace 7 reached 140° C., the pressure inside the bag 40 is raised to 0.1 MPa that is the atmospheric pressure, and the pressing pressure is decreased to 0 Pa. After that, a cooling step is performed by stopping heating the target 400 using the furnace 7 with the pressure inside the bag 40 maintained at the atmospheric pressure. Performing this cooling step causes the intermediate film 30 to be cooled to around normal temperature and be cured, thus forming a multi-layer laminate 100 in which the glass panel unit 10 and the transparent plate 20 are assembled together via the intermediate film 30.

In the example illustrated in FIG. 7, the assembling step includes raising the pressure inside the bag 40 stepwise as the temperature inside the furnace 7 rises. Alternatively, the pressure inside the bag 40 may be raised continuously. That is to say, the pressure inside the bag 40 after the initial stage of heating in the assembling step may be raised stepwise or continuously, whichever is appropriate, as long as the pressure does not decrease in any period since the initial stage of heating. In addition, the temperature inside the furnace 7 and the pressure inside the bag 40 in the assembling step are not limited to any particular values but may be changed as appropriate according to the material, shape, size, or any other parameter of the intermediate film 30.

1-2-3. Use of Multi-Layer Laminate

The multi-layer laminate 100 according to the first embodiment may be used in any field without limitation but is applicable to, for example, a field that requires high mechanical strength and excellent thermal insulation properties. Examples of uses of the multi-layer laminate 100 include various types of moving vehicles such as automobiles, railway trains, watercrafts, spacecrafts, and space stations. For example, when applied to an automobile, the multi-layer laminate 100 may be used in its front windshield, side windows, and rear windshield, for example.

2. Second Embodiment 2-1 Overview of Second Embodiment

Figure 8:
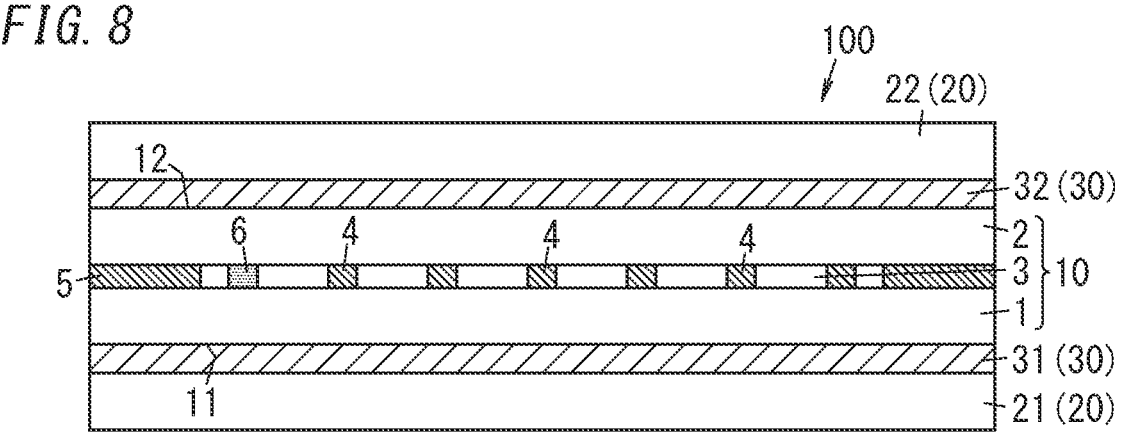
FIG. 8 is a schematic cross-sectional view illustrating an exemplary multi-layer laminate according to a second embodiment.

Next, a method for manufacturing a multi-layer laminate 100 according to a second embodiment will be described. The method according to this embodiment is designed to manufacture the multi-layer laminate 100 shown in FIG. 8. The multi-layer laminate 100 includes the glass panel unit 10, a first transparent plate 21, a first intermediate film 31, a second transparent plate 22, and a second intermediate film 32. The first transparent plate 21 is provided for the outer surface 11 of the first glass panel 1 of the glass panel unit 10. The first intermediate film 31 is interposed between the first glass panel 1 and the first transparent plate 21. The second transparent plate 22 is provided for the outer surface 12 of the second glass panel 2. The second intermediate film 32 is interposed between the second glass panel 2 and the second transparent plate 22.

In the multi-layer laminate 100 according to this embodiment, the first transparent plate 21 and the second transparent plate 22 are provided for the outer surface 11 of the first glass panel 1 and the outer surface 12 of the second glass panel 2, respectively. This allows the multi-layer laminate 100 to have improved mechanical strength, thermal insulation properties, and sound insulation compared to the glass panel unit 10 without any of these transparent plates 21, 22. In addition, this also makes the mechanical strength, thermal insulation properties, and sound insulation of this multi-layer laminate 100 superior to those of the multi-layer laminate 100 in which the transparent plate 20 is provided for only either the outer surface 11 of the first glass panel 1 or the outer surface 12 of the second glass panel 2.

Figure 9A:
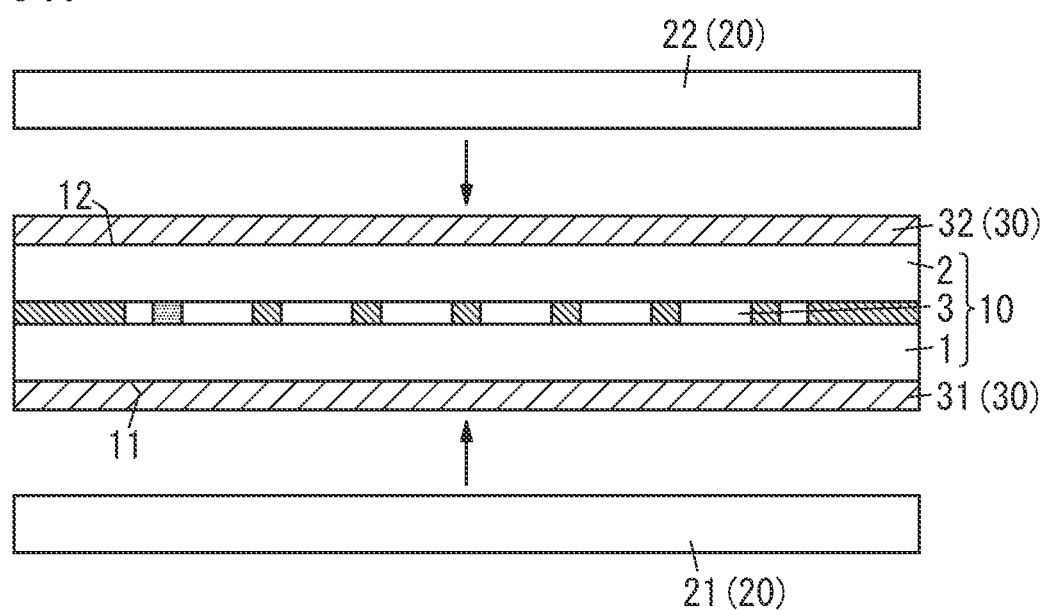
FIGS. 9A and 9B are schematic cross-sectional views illustrating an exemplary method for manufacturing the multi-layer laminate according to the second embodiment.

To manufacture the multi-layer laminate 100 according to this embodiment, the outer surface 11 of the first glass panel 1 of the glass panel unit 10 and the first transparent plate 21 are assembled together with the first intermediate film 31 interposed between themselves (see FIG. 9A). In addition, the outer surface 12 of the second glass panel 2 of the glass panel unit 10 and the second transparent plate 22 are assembled together with the second intermediate film 32 interposed between themselves (see FIG. 9A). In this manner, a multi-layer laminate 100 with excellent mechanical strength, thermal insulation properties, and sound insulation may be obtained.

2-2. Details of Second Embodiment

Next, the multi-layer laminate 100 according to the second embodiment and a method for manufacturing the same will be described in detail.

2-2-1. Multi-Layer Laminate

In the multi-layer laminate 100 according to this embodiment, the transparent plate 20 includes the first transparent plate 21 and the second transparent plate 22 described above, and the intermediate film 30 includes the first intermediate film 31 and the second intermediate film 32 described above. These constituent elements will be described in detail. In the following description, any constituent element of the multi-layer laminate 100 according to this second embodiment, having the same function as a counterpart of the multi-layer laminate 100 according to the first embodiment described above, will be designated by the same reference numeral as that counterpart's, and description thereof will be sometimes omitted herein.

(1) Glass Panel Unit

The glass panel unit 10 according to this embodiment has the same configuration as the glass panel unit 10 according to the first embodiment. Thus, the glass panel unit 10 includes: the first glass panel 1; the second glass panel 2; and the evacuated space 3 provided between the first glass panel 1 and the second glass panel 2. In addition, in the evacuated space 3, the plurality of pillars 4 are provided between the first glass panel 1 and the second glass panel 2.

(2) Transparent Plate

The transparent plate 20 according to this embodiment includes the first transparent plate 21 and the second transparent plate 22 as described above.

(2.1) First Transparent Plate

The first transparent plate 21, as well as the transparent plate 20 according to the first embodiment, is also a plate member having light-transmitting properties. The material for the first transparent plate 21 may also be the same as the material for the transparent plate 20 according to the first embodiment.

In the multi-layer laminate 100 according to this embodiment, the first transparent plate 21 is provided for the outer surface 11 of the first glass panel 1 of the glass panel unit 10. The first transparent plate 21 faces the glass panel unit 10. The first transparent plate 21 also faces the first glass panel 1.

(2.2) Second Transparent Plate

The second transparent plate 22 is a plate member having the same light-transmitting properties as the transparent plate 20 according to the first embodiment. The material for the second transparent plate 22 may also be the same as the material for the transparent plate 20 according to the first embodiment. In this embodiment, the material for the first transparent plate 21 and the material for the second transparent plate 22 may be either the same as each other or different from each other, whichever is appropriate.

For example, the first transparent plate 21 and the second transparent plate 22 may be both made of polycarbonate. Alternatively, the first transparent plate 21 and the second transparent plate 22 may be both made of glass, for example. Still alternatively, one of the first transparent plate 21 or the second transparent plate 22 may be made of polycarbonate and the other may be made of glass.

At least one of the first transparent plate 21 or the second transparent plate 22 preferably includes a glass pane. In addition, at least one of the first transparent plate 21 or the second transparent plate 22 preferably includes a polycarbonate plate.

In the multi-layer laminate 100 according to this embodiment, the second transparent plate 22 is provided for the outer surface 12 of the second glass panel 2 of the glass panel unit 10. The second transparent plate 22 faces the glass panel unit 10. The second transparent plate 22 also faces the second glass panel 2.

(3) Intermediate Film

The intermediate film 30 according to this embodiment includes the first intermediate film 31 and the second intermediate film 32 as described above.

(3.1) First Intermediate Film

The first intermediate film 31 may have the same configuration as the intermediate film 30 according to the first embodiment. In the multi-layer laminate 100 according to this embodiment, the first intermediate film 31 is interposed between the outer surface 11 of the first glass panel 1 of the glass panel unit 10 and the first transparent plate 21. Thus, the first intermediate film 31 may bond the glass panel unit 10 and the first transparent plate 21 together, and more specifically, bond the first glass panel 1 and the first transparent plate 21 together.

(3.2) Second Intermediate Film

The second intermediate film 32 may have the same configuration as the intermediate film 30 according to the first embodiment. In the multi-layer laminate 100 according to this embodiment, the second intermediate film 32 is interposed between the outer surface 12 of the second glass panel 2 of the glass panel unit 10 and the second transparent plate 22. Thus, the second intermediate film 32 may bond the glass panel unit 10 and the second transparent plate 22 together, and more specifically, bond the second glass panel 2 and the second transparent plate 22 together.

(3.3) Materials for First Intermediate Film and Second Intermediate Film

The first intermediate film 31 may have the same configuration as the intermediate film 30 according to the first embodiment as described above. Thus, the material for the first intermediate film 31 may be the same as the material for the intermediate film 30 according to the first embodiment.

Likewise, the second intermediate film 32 may have the same configuration as the intermediate film 30 according to the first embodiment as described above. Thus, the material for the second intermediate film 32 may also be the same as the material for the intermediate film 30 according to the first embodiment.

In the multi-layer laminate 100 according to this embodiment, the first intermediate film 31 and the second intermediate film 32 are preferably made of different materials. This would enhance the performance of the multi-layer laminate 100 while facilitating the manufacturing process thereof.

For example, at least one of the first intermediate film 31 or the second intermediate film 32 is preferably made of a PVB resin. This would ensure sufficient mechanical strength for the multi-layer laminate 100, to say the least. In addition, using a PVB resin of a grade that provides sound insulation, heat insulation, and UV cut properties would ensure sufficient mechanical strength and functionalities for the multi-layer laminate 100. In addition, this would also increase the anti-penetration ability of the multi-layer laminate 100.

In addition, at least one of the first intermediate film 31 or the second intermediate film 32 is preferably made of an EVA resin. This would increase the anti-scattering ability of the multi-layer laminate 100. In addition, using the EVA resin allows the glass panel unit 10 and the transparent plate(s) 21, 22 to be bonded together at a relatively low temperature, thus facilitating the manufacturing process of the multi-layer laminate 100 as well. This would also increase the handleability of the multi-layer laminate 100.

Furthermore, at least one of the first intermediate film 31 or the second intermediate film 32 is preferably made of an ionomer resin. This would increase the anti-scattering ability, anti-penetration ability, and mechanical strength of the multi-layer laminate 100. In addition, the ionomer resin allows the glass panel unit 10 and the transparent plate(s) 21, 22 to be bonded together at the same temperature as the PVB resin, thus facilitating the manufacturing process of the multi-layer laminate 100. This would also increase the mechanical strength of the overall multi-layer laminate 100.

Furthermore, at least one of the first intermediate film 31 or the second intermediate film 32 is preferably made of a cycloolefin resin. This would increase the transparency, waterproofness, and bond strength of the multi-layer laminate 100. In addition, the cycloolefin resin allows the glass panel unit 10 and the transparent plate(s) 21, 22 to be bonded together at the same temperature as the PVB resin, thus facilitating the manufacturing process of the multi-layer laminate 100.

Furthermore, in this embodiment, the first intermediate film 31 and the second intermediate film 32 are preferably made of different materials. In that case, each of the first intermediate film 31 and the second intermediate film 32 may be made of, for example, a resin selected from the group consisting of the PVB resin, the EVA resin, the ionomer resin, the cycloolefin resin, and the polyolefin resin. Making the first intermediate film 31 and the second intermediate film 32 of two different materials in this manner would allow the multi-layer laminate 100 to achieve both the advantages of the material for the first intermediate film 31 and the advantages of the material for the second intermediate film 32 alike.

For example, it is recommended that the first intermediate film 31 be made of the PVB resin and the second intermediate film 32 be made of the EVA resin. Alternatively, it is also recommended that the first intermediate film 31 be made of the EVA resin and the second intermediate film 32 be made of the PVB resin. In each of these cases, the manufacturing process of the multi-layer laminate 100 may be facilitated with sufficient mechanical strength ensured for the multi-layer laminate 100. That is to say, the mechanical strength enhancement and simplified manufacturing process are achieved at the same time for the multi-layer laminate 100. In addition, the multi-layer laminate 100 with each of these configurations ensures provide the anti-penetration ability and the anti-scattering ability at a time. For example, one of the first intermediate film 31 or the second intermediate film 32 which is required to have sufficient anti-penetration ability is preferably made of the PVB resin and the other intermediate film 31, 32 required to have anti-scattering ability is preferably made of the EVA resin. In addition, using a sound insulating PVB resin as the PVB resin would increase not only the anti-penetration ability and anti-scattering ability of the multi-layer laminate 100 but also the sound insulation thereof as well. The sound insulating PVB resin is suitably used for windows of buildings and railway trains that are required to curtail noise as much as possible for noise-sensitive people and for windows of automobiles and other vehicles in the field of mobility.

Alternatively, in this embodiment, the first intermediate film 31 and the second intermediate film 32 may also be made of the same material. In that case, the advantages of the material for the first intermediate film 31 and the second intermediate film 32 would be achieved particularly significantly.

For example, the first intermediate film 31 and the second intermediate film 32 are preferably both made of the PVB resin. This would increase the mechanical strength of the multi-layer laminate 100 particularly significantly. In addition, this would also increase the anti-penetration ability of the multi-layer laminate 100 particularly significantly. Alternatively, the first intermediate film 31 and the second intermediate film 32 are also preferably both made of the EVA resin. This would facilitate the manufacturing process of the multi-layer laminate 100 particularly significantly. In addition, this would also increase the anti-scattering ability of the multi-layer laminate 100 particularly significantly.

2-2-2. Method for Manufacturing Multi-Layer Laminate

The multi-layer laminate 100 according to this embodiment may be manufactured by performing, for example, the following process steps. Note that the following method for manufacturing the multi-layer laminate 100 is only an example and should not be construed as limiting.

First, as shown in FIG. 9A, the glass panel unit 10, the transparent plate 20, and the intermediate film 30 are provided. In the multi-layer laminate 100 according to this embodiment, the transparent plate 20 includes the first transparent plate 21 and the second transparent plate 22, and the intermediate film 30 includes the first intermediate film 31 and the second intermediate film 32. Thus, the first transparent plate 21 and the second transparent plate 22 are provided as the transparent plate 20, and the first intermediate film 31 and the second intermediate film 32 are provided as the intermediate film 30.

Next, the glass panel unit 10 and the transparent plate 20 are assembled together via the intermediate film 30 (see FIG. 9A). In this embodiment, the outer surface 11 of the first glass panel 1 of the glass panel unit 10 and the first transparent plate 21 are assembled together with the first intermediate film 31 interposed between themselves. In addition, the outer surface 12 of the second glass panel 2 of the glass panel unit 10 and the second transparent plate 22 are assembled together with the second intermediate film 32 interposed between themselves.

In each of the process step of assembling the glass panel unit 10 and the first transparent plate 21 together and the process step of assembling the glass panel unit 10 and the second transparent plate 22 together, the pressure applied for assembling is less than the compressive strength of the resin pillars 4 included in the glass panel unit 10. This may reduce the chances of the plurality of resin pillars 4 included in the glass panel unit 10 collapsing under the pressure.

Assembling the glass panel unit 10 and the first transparent plate 21 and assembling the glass panel unit 10 and the second transparent plate 22 may be performed either separately from each other or simultaneously, whichever is appropriate.

For example, if the first intermediate film 31 and the second intermediate film 32 are made of the same material, then assembling the glass panel unit 10 and the first transparent plate 21 and assembling the glass panel unit 10 and the second transparent plate 22 are preferably performed simultaneously. This allows manufacturing the multi-layer laminate 100 efficiently. For example, the first intermediate film 31 and the second intermediate film 32 are preferably both made of the PVB resin. In that case, the glass panel unit 10, the first transparent plate 21, and the second transparent plate 22 are preferably assembled together at a relative humidity of 10% or less. This allows bonding the glass panel unit 10 and the first transparent plate 21 together only by heating and bonding the glass panel unit 10 and the second transparent plate 22 together only by heating. This may also reduce the chances of the first intermediate film 31 and the second intermediate film 32 made of the PVB resin losing their transparency or producing bubbles therein. Alternatively, both the first intermediate film 31 and the second intermediate film 32 are preferably made of, for example, the EVA resin.

Figure 9B:
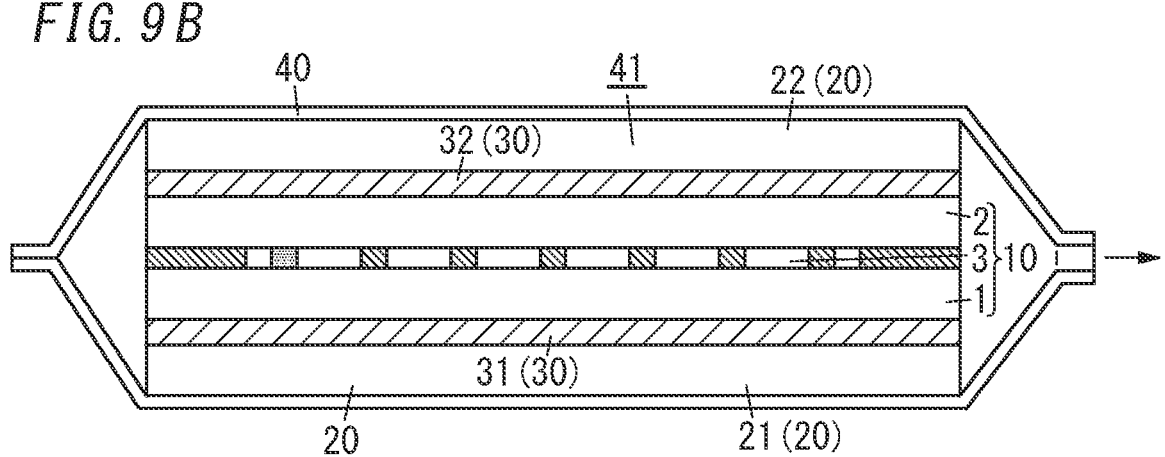

In this embodiment, the glass panel unit 10, the first transparent plate 21, and the second transparent plate 22 are assembled together by the vacuum bagging process. For example, a laminate 41 is loaded into the bag 40 as shown in FIG. 9B. The laminate 41 includes the glass panel unit 10, the first intermediate film 31, the first transparent plate 21, the second intermediate film 32, and the second transparent plate 22. The laminate 41 is formed by sandwiching the first intermediate film 31 between the glass panel unit 10 and the first transparent plate 21 and sandwiching the second intermediate film 32 between the glass panel unit 10 and the second transparent plate 22. Then, with gases exhausted from this bag 40, the glass panel unit 10 and the first transparent plate 21 are assembled together via the first intermediate film 31, while at the same time, the glass panel unit 10 and the second transparent plate 22 are assembled together via the second intermediate film 32. In this case, as in the first embodiment, the pressure inside the bag 40 is also raised from the pressure at the initial stage of heating with the temperature of the intermediate films 30 increased to the predetermined temperature at which the intermediate films 30 melt.

Assembling the glass panel unit 10, the first transparent plate 21, and the second transparent plate 22 together in this manner by the vacuum bagging process makes it easier to apply pressure uniformly to the first intermediate film 31 and the second intermediate film 32 and decrease the humidity inside the bag 40. This may reduce the chances of the first intermediate film 31 and the second intermediate film 32 losing their transparency or producing bubbles therein. Note that the first intermediate film 31 and the second intermediate film 32 may be dried before being loaded into the bag 40 or after having been loaded into the bag 40, whichever is appropriate.

In this embodiment, the bag 40 may also be heated by the furnace 7 as in the first embodiment described above. Particularly, in this second embodiment, if the bag 40 is placed in a flat position inside the furnace 7, either the first intermediate film 31 or the second intermediate film 32 may be interposed between the base 73 and the glass panel unit 10. Since the glass panel unit 10 has excellent thermal insulation properties, heat is transferred less smoothly to the intermediate film, located closer to the base, out of the first intermediate film 31 and the second intermediate film 32. Thus, in this embodiment, heat is preferably applied uniformly to both the first intermediate film 31 and the second intermediate film 32.

For example, a gap is preferably left between the bag 40 loaded with the laminate 41 and the base on which the bag 40 is mounted. This allows the bag 40 to be heated not only from over, but also from under, the bag 40. That is to say, this enables heating the bag 40 from both sides more easily, thus making it easier to heat the first intermediate film 31 and the second intermediate film 32 uniformly. For example, as in the example shown in FIG. 5, the base 73 may be made of a material having better thermal conductivity than the bag 40 and the ventilation space 730 is created in the base 73. Alternatively, a raised portion having such a shape as to collect heat such as a heat sink is preferably provided for a portion, exposed to the hot air, of the base 73 (which is made of a material with good thermal conductivity). This also enables heating the bag 40 from both sides more easily, thus making it easier to heat the first intermediate film 31 and the second intermediate film 32 uniformly. Still alternatively, the bag 40 loaded with the laminate 41 is also preferably heated in an upright position. This also allows the bag 40 to be heated more easily from both sides thereof, thus making it easier to heat the first intermediate film 31 and the second intermediate film 32 uniformly.

Naturally, even if both the first intermediate film 31 and the second intermediate film 32 are made of the EVA resin, the ionomer resin, the cycloolefin resin, or the polyolefin resin, the glass panel unit 10, the first transparent plate 21, and the second transparent plate 22 may also be bonded together by the same vacuum bagging process as the one adopted for the first embodiment.

For example, if the first intermediate film 31 and the second intermediate film 32 are made of different materials, then assembling the glass panel unit 10 and the first transparent plate 21 and assembling the glass panel unit 10 and the second transparent plate 22 are preferably performed separately from each other. The reason is as follows. Specifically, if the first intermediate film 31 and the second intermediate film 32 are made of different materials, then there may be a difference between the heating temperature required for bonding with the first intermediate film 31 and the heating temperature required for bonding with the second intermediate film 32. Thus, if the first intermediate film 31 and the second intermediate film 32 made of different materials are heated simultaneously, then the bond strength may be insufficient or the intermediate films 30 may be deformed, for example. In this respect, assembling the glass panel unit 10 and the first intermediate film 31 separately from assembling the glass panel unit 10 and the second intermediate film 32 may reduce the chances of the bond strength becoming insufficient or the intermediate films 30 being deformed or damaged, for example.

Specifically, one intermediate film, requiring the higher heating temperature for bonding, out of the first intermediate film 31 and the second intermediate film 32 is preferably bonded earlier than the other intermediate film. For example, if the heating temperature of the first intermediate film 31 is higher than the heating temperature of the second intermediate film 32, then the glass panel unit 10 and the second transparent plate 22 are preferably assembled together via the second intermediate film 32 by the vacuum bagging process after the glass panel unit 10 and the first transparent plate 21 have been assembled together via the first intermediate film 31 by the vacuum bagging process. Alternatively, if the heating temperature of the second intermediate film 32 is higher than the heating temperature of the first intermediate film 31, then the glass panel unit 10 and the first transparent plate 21 are preferably assembled together via the first intermediate film 31 by the vacuum bagging process after the glass panel unit 10 and the second transparent plate 22 have been assembled together via the second intermediate film 32 by the vacuum bagging process.

For example, if the first intermediate film 31 is made of the PVB resin and the second intermediate film 32 is made of the EVA resin, then the heating temperature required for bonding with the first intermediate film 31 made of the PVB resin may be higher than the heating temperature required for bonding with the second intermediate film 32 made of the EVA resin. In that case, the glass panel unit 10 and the second transparent plate 22 are preferably assembled together by the vacuum bagging process via the second intermediate film 32 made of the EVA resin after the glass panel unit 10 and the first transparent plate 21 have been assembled together by the vacuum bagging process via the first intermediate film 31 made of the PVB resin.

As can be seen from the foregoing description of the first and second embodiments, a method for manufacturing a multi-layer laminate (100) according to a first aspect has the following features. The multi-layer laminate (100) includes a glass panel unit (10), an intermediate film (30), and a transparent plate (20). The transparent plate (20) is assembled to the glass panel unit (10) via the intermediate film (30). The glass panel unit (10) includes a first glass panel (1), a second glass panel (2), and an evacuated space (3). The evacuated space (3) is interposed between the first glass panel (1) and the second glass panel (2). The method for manufacturing the multi-layer laminate (100) includes a step (assembling step). The step includes exhausting a gas from a bag (40), loaded with the glass panel unit (10), the intermediate film (30), and the transparent plate (20), to cause the bag (40) to shrink and thereby assembling, using the bag (40) thus shrunk, the glass panel unit (10) and the transparent plate (20) via the intermediate film (30). The step includes raising a pressure inside the bag (40) from a pressure at an initial stage of heating while increasing a temperature of the intermediate film (30) to a predetermined temperature at which the intermediate film (30) softens.

This aspect enables manufacturing a multi-layer laminate (100) which has excellent thermal insulation properties and mechanical strength and in which the transparent plate (20) is assembled onto the glass panel unit (10) via the intermediate film (30). In addition, the glass panel unit (10) and the transparent plate (20) are assembled to each other using the bag (40) that has been caused to shrink by exhausting gases therefrom. This enables applying pressure uniformly to the intermediate film (30) and reducing the chances of the intermediate film (30) losing its transparency or producing bubbles therein. Furthermore, raising the pressure inside the bag (40) while increasing the temperature of the intermediate film (30) to a predetermined temperature at which the intermediate film (30) softens enables assembling the glass panel unit (10) and the transparent plate (20) together with an appropriate pressure while reducing the chances of the intermediate film (30) sticking out from the gap between the glass panel unit (10) and the transparent plate (20).

A method for manufacturing a multi-layer laminate (100) according to a second aspect may be implemented in conjunction with the first aspect. In the second aspect, the step includes changing a pressing pressure applied from the bag (40) onto a laminate (41) including the glass panel unit (10), the intermediate film (30), and the transparent plate (20) within a range from 0.02 atm to 3 atm.

This aspect enables assembling the glass panel unit (10) and the transparent plate (20) together with a more appropriate pressure while further reducing the chances of the intermediate film (30) sticking out from the gap between the glass panel unit (10) and the transparent plate (20).

A method for manufacturing a multi-layer laminate (100) according to a third aspect may be implemented in conjunction with the first or second aspect. In the third aspect, the step includes setting, when the temperature of the intermediate film (30) is equal to the predetermined temperature, the pressure inside the bag (40) at the atmospheric pressure and then lowering the temperature of the intermediate film (30).

According to this aspect, setting, when the temperature of the intermediate film (30) is equal to the predetermined temperature, the pressure inside the bag (40) at the atmospheric pressure enables further reducing the chances of the intermediate film (30) sticking out from the gap between the glass panel unit (10) and the transparent plate (20).

A method for manufacturing a multi-layer laminate (100) according to a fourth aspect may be implemented in conjunction with any one of the first to third aspects. In the fourth aspect, the step includes raising the pressure inside the bag (40) stepwise while increasing the temperature of the intermediate film (30) to the predetermined temperature at which the intermediate film (30) softens.

According to this aspect, raising the pressure inside the bag (40) stepwise in the assembling step enables assembling the glass panel unit (10) and the transparent plate (20) together with an appropriate pressure while reducing the chances of the intermediate film (30) sticking out from the gap between the glass panel unit (10) and the transparent plate (20).

A method for manufacturing a multi-layer laminate (100) according to a fifth aspect may be implemented in conjunction with any one of the first to fourth aspects. The fifth aspect has the following features. The intermediate film (30) is made of a PVB resin. The step includes assembling, using the bag (40), the glass panel unit (10) and the transparent plate (20) via the intermediate film (30) while setting a moisture content of the intermediate film (30) at a value equal to or greater than 0.1% by weight and equal to or less than 0.5% by weight.

According to this aspect, making the intermediate film (30) of a PVB resin enables reducing the chances of causing a decline in the anti-penetration ability of the intermediate film (30) and/or the intermediate film (30) losing its transparency or producing bubbles therein. In addition, setting a moisture content of the intermediate film (30) at a value equal to or greater than 0.1% by weight and equal to or less than 0.5% by weight when assembling the glass panel unit (10) and the transparent plate (20) via the intermediate film (30) enables assembling the glass panel unit (10) and the transparent plate (20) via the intermediate film (30) while reducing the chances of causing damage, deformation, and other inconveniences to the first glass panel (1) and the second glass panel (2).

REFERENCE SIGNS LIST

1 First Glass Panel
2 Second Glass Panel
3 Evacuated Space
10 Glass Panel Unit
20 Transparent Plate
30 Intermediate Film
40 Bag
100 Multi-Layer Laminate

The invention claimed is:

1. A method for manufacturing a multi-layer laminate, the multi-layer laminate comprising:
   a glass panel unit;
   an intermediate film; and
   a transparent plate assembled to the glass panel unit via the intermediate film,
   the glass panel unit including:
   a first glass panel;
   a second glass panel; and
   an evacuated space interposed between the first glass panel and the second glass panel,
   the method comprising:
   a step of exhausting a gas from a bag, loaded with the glass panel unit, the intermediate film, and the transparent plate, to cause the bag to shrink and thereby assembling, using the bag thus shrunk, the glass panel unit and the transparent plate via the intermediate film,
   wherein the step includes raising a pressure inside the bag stepwise or continuously from a pressure at an initial stage of heating while increasing a temperature of the intermediate film to a predetermined temperature at which the intermediate film softens.

2. The method of claim 1, wherein
the step includes changing a pressing pressure applied from the bag onto a laminate including the glass panel unit, the intermediate film, and the transparent plate within a range from 0.02 atm to 3 atm.

3. The method of claim 1, wherein
the step includes setting, when the temperature of the intermediate film is equal to the predetermined temperature, the pressure inside the bag at the atmospheric pressure and then lowering the temperature of the intermediate film.

4. The method of claim 1, wherein
the step includes raising the pressure inside the bag stepwise while increasing the temperature of the intermediate film to the predetermined temperature at which the intermediate film softens.

5. The method of claim 1, wherein
the intermediate film is made of a PVB resin, and
the step includes assembling, using the bag, the glass panel unit and the transparent plate via the intermediate film while setting a moisture content of the intermediate film at a value equal to or greater than 0.1% by weight and equal to or less than 0.5% by weight.

6. The method of claim 2, wherein
the step includes setting, when the temperature of the intermediate film is equal to the predetermined temperature, the pressure inside the bag at the atmospheric pressure and then lowering the temperature of the intermediate film.

7. The method of claim 2, wherein
the step includes raising the pressure inside the bag stepwise while increasing the temperature of the intermediate film to the predetermined temperature at which the intermediate film softens.

8. The method of claim 3, wherein
the step includes raising the pressure inside the bag stepwise while increasing the temperature of the intermediate film to the predetermined temperature at which the intermediate film softens.

9. The method of claim 6, wherein
the step includes raising the pressure inside the bag stepwise while increasing the temperature of the intermediate film to the predetermined temperature at which the intermediate film softens.

10. The method of claim 2, wherein
the intermediate film is made of a PVB resin, and
the step includes assembling, using the bag, the glass panel unit and the transparent plate via the intermediate film while setting a moisture content of the intermediate film at a value equal to or greater than 0.1% by weight and equal to or less than 0.5% by weight.

11. The method of claim 3, wherein
the intermediate film is made of a PVB resin, and
the step includes assembling, using the bag, the glass panel unit and the transparent plate via the intermediate film while setting a moisture content of the intermediate film at a value equal to or greater than 0.1% by weight and equal to or less than 0.5% by weight.

12. The method of claim 6, wherein
the intermediate film is made of a PVB resin, and
the step includes assembling, using the bag, the glass panel unit and the transparent plate via the intermediate film while setting a moisture content of the intermediate film at a value equal to or greater than 0.1% by weight and equal to or less than 0.5% by weight.

13. The method of claim 4, wherein
the intermediate film is made of a PVB resin, and
the step includes assembling, using the bag, the glass panel unit and the transparent plate via the intermediate film while setting a moisture content of the intermediate film at a value equal to or greater than 0.1% by weight and equal to or less than 0.5% by weight.

14. The method of claim 7, wherein
the intermediate film is made of a PVB resin, and
the step includes assembling, using the bag, the glass panel unit and the transparent plate via the intermediate film while setting a moisture content of the intermediate film at a value equal to or greater than 0.1% by weight and equal to or less than 0.5% by weight.

15. The method of claim 8, wherein
the intermediate film is made of a PVB resin, and
the step includes assembling, using the bag, the glass panel unit and the transparent plate via the intermediate film while setting a moisture content of the intermediate film at a value equal to or greater than 0.1% by weight and equal to or less than 0.5% by weight.

16. The method of claim 9, wherein
the intermediate film is made of a PVB resin, and
the step includes assembling, using the bag, the glass panel unit and the transparent plate via the intermediate film while setting a moisture content of the intermediate film at a value equal to or greater than 0.1% by weight and equal to or less than 0.5% by weight.

* * * * *